(12) United States Patent
Feiguine et al.

(10) Patent No.: US 11,032,381 B2
(45) Date of Patent: Jun. 8, 2021

(54) DISCOVERY AND STORAGE OF RESOURCE TAGS

(71) Applicant: ServiceNow, Inc., Santa Clara, CA (US)

(72) Inventors: Alexandra Feiguine, Sha'ar Efrayim (IL); Shay Herzog, Raanana (IL); Shiri Hameiri, Kfar Saba (IL); Daniel Badyan, Tel Aviv (IL); Asaf Garty, Sdei Hemed (IL); Robert Bitterfeld, Petach Tikva (IL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/445,914

(22) Filed: Jun. 19, 2019

(65) Prior Publication Data

US 2020/0404059 A1     Dec. 24, 2020

(51) Int. Cl.
*H04L 29/08* (2006.01)
*H04L 9/08* (2006.01)
(Continued)

(52) U.S. Cl.
CPC .............. *H04L 67/16* (2013.01); *H04L 67/10* (2013.01); *H04L 67/20* (2013.01); *H04L 67/2804* (2013.01)

(58) Field of Classification Search
CPC ..... H04L 67/16; H04L 67/2804; H04L 67/10; H04L 67/20
See application file for complete search history.

(56) References Cited

U.S. PATENT DOCUMENTS

| 5,978,594 | A  | 11/1999 | Bonnell |
| 6,321,229 | B1 | 11/2001 | Goldman |

(Continued)

FOREIGN PATENT DOCUMENTS

| WO | WO-2018070436 A1 * | 4/2018 | ......... H04L 12/1407 |
| WO | WQ-2020039054 A1 * | 2/2020 | ........... H04L 67/327 |

OTHER PUBLICATIONS

Amazon.com, Resource Groups Tagging API, downloaded from https://docs.aws.amazon.com/resourcegroupstagging/latest/APIReference/Welcome.html on Jun. 10, 2019 (34 pages).

(Continued)

*Primary Examiner* — David R Lazaro
*Assistant Examiner* — Berhanu Shitayewoldetadik
(74) *Attorney, Agent, or Firm* — Fletcher Yoder PC

(57) ABSTRACT

A system may contain a computational instance including persistent storage that maintains a discovery pattern and credentials for a cloud-based service, where the cloud-based service provides a remote computing infrastructure. The system may also contain one or more processors configured to: remotely access, using the credentials, the cloud-based service; execute the discovery pattern to obtain copies of tags configured in the cloud-based service, where the tags each include key fields, value fields, and resource identifier fields, and where the resource identifier fields uniquely specify respective computational resources of the cloud-based service; associate the tags that were discovered to configuration item representations of the respective computational resources; and store, in the persistent storage, the tags and their associations to the configuration item representations.

18 Claims, 11 Drawing Sheets

(51) Int. Cl.
     *G06F 9/48*      (2006.01)
     *H04L 12/24*     (2006.01)

(56)            References Cited

U.S. PATENT DOCUMENTS

| | | |
|---|---|---|
| 6,609,122 B1 | 8/2003 | Ensor |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,877,783 B1 | 1/2011 | Cline |
| 7,890,802 B2 | 2/2011 | Gerber |
| 7,925,981 B2 | 4/2011 | Pourheidari |
| 7,930,396 B2 | 4/2011 | Trinon |
| 7,933,927 B2 | 4/2011 | Dee |
| 7,941,506 B2 | 5/2011 | Bonal |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,224,683 B2 | 7/2012 | Manos |
| 8,266,096 B2 | 9/2012 | Navarrete |
| 8,346,752 B2 | 1/2013 | Sirota |
| 8,380,645 B2 | 2/2013 | Kowalski |
| 8,402,127 B2 | 3/2013 | Solin |
| 8,407,773 B1* | 3/2013 | Hayter .................. H04W 12/06 726/7 |
| 8,447,829 B1* | 5/2013 | Geller ..................... H04L 67/10 709/217 |
| 8,457,928 B2 | 6/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,646,093 B2 | 2/2014 | Myers |
| 8,674,992 B2 | 3/2014 | Poston |
| 8,683,032 B2 | 3/2014 | Spinelli |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 8,907,988 B2 | 12/2014 | Poston |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,261,372 B2 | 2/2016 | Cline |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,534,903 B2 | 1/2017 | Cline |
| 9,535,737 B2 | 1/2017 | Joy |
| 9,613,070 B2 | 4/2017 | Kumar |
| 9,631,934 B2 | 4/2017 | Cline |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 9,967,162 B2 | 5/2018 | Spinelli |
| 10,002,203 B2 | 6/2018 | George |
| 10,430,441 B1* | 10/2019 | Canton .................. G06F 16/29 |
| 10,623,433 B1* | 4/2020 | Veselov .............. G06F 9/45558 |
| 10,681,547 B1* | 6/2020 | Yang .................. H04L 61/6022 |
| 10,757,106 B2* | 8/2020 | Yuan ..................... H04L 67/10 |
| 10,855,537 B2* | 12/2020 | Tembey ................ H04L 67/38 |
| 2004/0049702 A1* | 3/2004 | Subramaniam ....... G06Q 20/382 726/28 |
| 2005/0289644 A1* | 12/2005 | Wray .................. H04L 63/0815 726/5 |
| 2006/0178898 A1* | 8/2006 | Habibi ............... G06Q 30/0601 705/1.1 |
| 2012/0072318 A1* | 3/2012 | Akiyama ............... G06Q 40/12 705/30 |
| 2012/0110055 A1* | 5/2012 | Van Biljon ............ G06Q 30/04 709/201 |
| 2012/0131652 A1* | 5/2012 | Anand .................. H04L 67/303 726/6 |
| 2012/0311575 A1* | 12/2012 | Song .................... G06F 9/5077 718/1 |
| 2013/0067072 A1* | 3/2013 | Gupta .................... H04L 67/40 709/224 |
| 2013/0080509 A1* | 3/2013 | Wang ..................... H04L 12/66 709/203 |
| 2013/0132854 A1* | 5/2013 | Raleigh .................. H04W 4/60 715/738 |
| 2013/0247144 A1* | 9/2013 | Marshall ................ H04L 63/10 726/1 |
| 2013/0311603 A1* | 11/2013 | Wang .................... G06F 9/5077 709/217 |
| 2013/0318242 A1* | 11/2013 | Srinivasa .............. G06F 9/5011 709/226 |
| 2014/0215212 A1* | 7/2014 | Dempster ............... H04L 67/10 713/168 |
| 2014/0281131 A1* | 9/2014 | Joshi .................... G06F 12/0868 711/103 |
| 2015/0074743 A1* | 3/2015 | Ilieva ..................... H04L 63/10 726/1 |
| 2015/0134956 A1* | 5/2015 | Stachura ............. H04L 63/0807 713/168 |
| 2015/0236902 A1* | 8/2015 | Alam ................... H04L 41/082 709/221 |
| 2015/0242204 A1* | 8/2015 | Hassine ............. H04L 41/0853 717/121 |
| 2015/0319185 A1* | 11/2015 | Kirti .................... H04L 67/306 726/23 |
| 2015/0334110 A1* | 11/2015 | Bishop ................... H04L 67/16 713/156 |
| 2016/0087956 A1* | 3/2016 | Maheshwari ............ G06F 8/60 726/6 |
| 2016/0092180 A1* | 3/2016 | Straub ................... G06T 1/0007 715/762 |
| 2016/0092339 A1* | 3/2016 | Straub ................. H04L 67/2814 717/124 |
| 2016/0173406 A1* | 6/2016 | Geller ................... H04L 9/3239 709/225 |
| 2016/0179416 A1* | 6/2016 | Mutha .................. G06F 3/0619 711/162 |
| 2016/0179876 A1* | 6/2016 | Jimenez Peris ......... H04L 67/42 707/703 |
| 2016/0191524 A1* | 6/2016 | Bathija .................. H04L 47/10 726/3 |
| 2016/0344831 A1* | 11/2016 | Schneider ............... H04L 67/10 |
| 2017/0005873 A1* | 1/2017 | Strandzhev ......... G06F 9/45558 |
| 2017/0006135 A1* | 1/2017 | Siebel .................. G06F 9/5072 |
| 2017/0048215 A1* | 2/2017 | Straub ................... H04L 63/06 |
| 2017/0048252 A1* | 2/2017 | Straub ................... H04L 67/06 |
| 2017/0048319 A1* | 2/2017 | Straub ............... H04W 12/0027 |
| 2017/0048339 A1* | 2/2017 | Straub ..................... G06F 8/71 |
| 2017/0085447 A1* | 3/2017 | Chen ................... H04L 43/024 |
| 2017/0093645 A1* | 3/2017 | Zhong ................... H04L 67/10 |

(56) References Cited

U.S. PATENT DOCUMENTS

| | | | |
|---|---|---|---|
| 2017/0093752 A1* | 3/2017 | Mohaisen | H04L 9/3271 |
| 2017/0099280 A1* | 4/2017 | Goel | H04L 63/168 |
| 2017/0118268 A1* | 4/2017 | Wu | H04L 67/10 |
| 2017/0201850 A1* | 7/2017 | Raleigh | G06F 3/0482 |
| 2017/0223117 A1* | 8/2017 | Messerli | H04L 12/4641 |
| 2017/0236347 A1* | 8/2017 | Drako | G07C 9/22 |
| | | | 340/5.33 |
| 2017/0337291 A1* | 11/2017 | Chavez | G06F 16/972 |
| 2018/0039771 A1* | 2/2018 | Konstantinov | G06F 21/335 |
| 2018/0167464 A1* | 6/2018 | Bostick | H04L 63/0407 |
| 2018/0236181 A1* | 8/2018 | Marlin | A61M 5/44 |
| 2018/0253239 A1* | 9/2018 | Mutha | G06F 3/065 |
| 2018/0316676 A1* | 11/2018 | Gilpin | H04L 9/0891 |
| 2018/0316757 A1* | 11/2018 | Tucker | G06F 16/958 |
| 2018/0322430 A1* | 11/2018 | Guha | G06Q 30/016 |
| 2018/0324159 A1* | 11/2018 | Koya | H04L 63/045 |
| 2019/0068627 A1* | 2/2019 | Thampy | H04W 12/12 |
| 2019/0068690 A1* | 2/2019 | Canton | H04L 67/10 |
| 2019/0116153 A1* | 4/2019 | Deverakonda Venkata | |
| | | | H04L 61/303 |
| 2019/0132378 A1* | 5/2019 | Perl | H04L 69/329 |
| 2019/0149436 A1* | 5/2019 | Park | H04L 41/5054 |
| | | | 709/226 |
| 2019/0166007 A1* | 5/2019 | Sundaram | G06F 9/5044 |
| 2019/0207945 A1* | 7/2019 | Yuan | H04L 63/102 |
| 2019/0268361 A1* | 8/2019 | Blewett | G06F 16/248 |
| 2019/0327144 A1* | 10/2019 | Tembey | H04L 41/5048 |
| 2019/0342397 A1* | 11/2019 | Laibson | H04L 67/125 |
| 2020/0089887 A1* | 3/2020 | Luthra | H04L 63/1433 |
| 2020/0137021 A1* | 4/2020 | Janakiraman | H04L 63/08 |
| 2020/0322442 A1* | 10/2020 | Luo | H04L 41/0672 |
| 2020/0348978 A1* | 11/2020 | Stephen | H04L 63/00 |
| 2020/0374351 A1* | 11/2020 | Momchilov | H04L 67/42 |

OTHER PUBLICATIONS

Barr, New—AWS Resource Tagging API, Mar. 30, 2017 (9 pages).

* cited by examiner

DISCOVERY AND STORAGE OF RESOURCE TAGS

BACKGROUND

Public cloud services provide various computational resources for use by individuals or organizations. Advantageously, public cloud services largely eliminate the need for these users to obtain, configure, and maintain computer infrastructure (e.g., hardware) and various platform services (e.g., software environments) for certain operations.

Some public cloud services allow tagging of individual resources. Tags may be free-form text strings, for example, that provide key-value pairs. Configured properly, tags make it easier for public cloud users to organize, search for, and filter lists of resources. But when the public cloud users also employ a remote network management platform for overall administration of their network and cloud resources, these tags are unable to correlate discovered configuration items and services spread across the public cloud and the managed network.

SUMMARY

The embodiments herein provide way of discovering tagged resources in a public cloud environment. In particular, a remote network management platform may query one or more application programming interfaces (APIs) of a public cloud provider to obtain the tags associated with some or all public cloud resources used by an organization. These queries may take place during or separately from discovery of the resources. Regardless, the tags may be stored in a database of the remote network management platform and associated with discovered configuration items.

Advantageously, this allows an organization to arrange, search, and filter configuration items based on tags. Further, the tags may be used to define or augment configuration items and relationships therebetween (such as, for example, services that involve coordination between multiple configuration items). Additionally, storing the tags in the database and associating them with configuration items allows for consistent identification of similar types of resources or related resources that span multiple public cloud providers.

Accordingly, a first example embodiment may involve a computational instance including persistent storage that maintains a discovery pattern and credentials for a cloud-based service, where the cloud-based service provides a remote computing infrastructure. The first example embodiment may also involve one or more processors configured to: remotely access, using the credentials, the cloud-based service; execute the discovery pattern to obtain copies of tags configured in the cloud-based service, where the tags each include key fields, value fields, and resource identifier fields, and where the resource identifier fields uniquely specify respective computational resources of the cloud-based service; associate the tags that were discovered to configuration item representations of the respective computational resources; and store, in the persistent storage, the tags and their associations to the configuration item representations.

A second example embodiment may involve remotely accessing, using credentials, a cloud-based service, where the cloud-based service provides a remote computing infrastructure. The second example embodiment may also involve executing a discovery pattern to obtain copies of tags configured in the cloud-based service, where the tags each include key fields, value fields, and resource identifier fields, and where the resource identifier fields uniquely specify respective computational resources of the cloud-based service. The second example embodiment may also involve associating the tags that were discovered to configuration item representations of the respective computational resources. The second example embodiment may also involve storing, in persistent storage, the tags and their associations to the configuration item representations.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
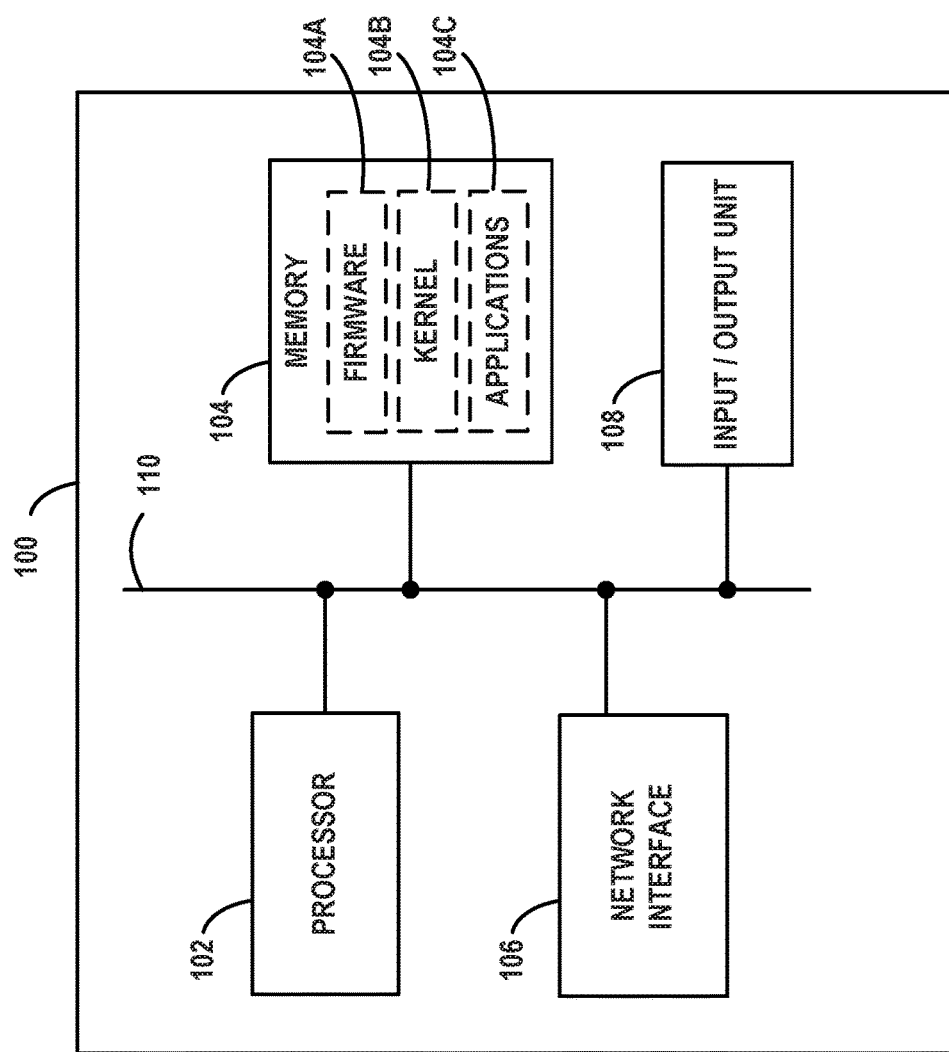
FIG. 1 illustrates a schematic drawing of a computing device, in accordance with example embodiments.

Example methods, devices, and systems are described herein. It should be understood that the words "example"

and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
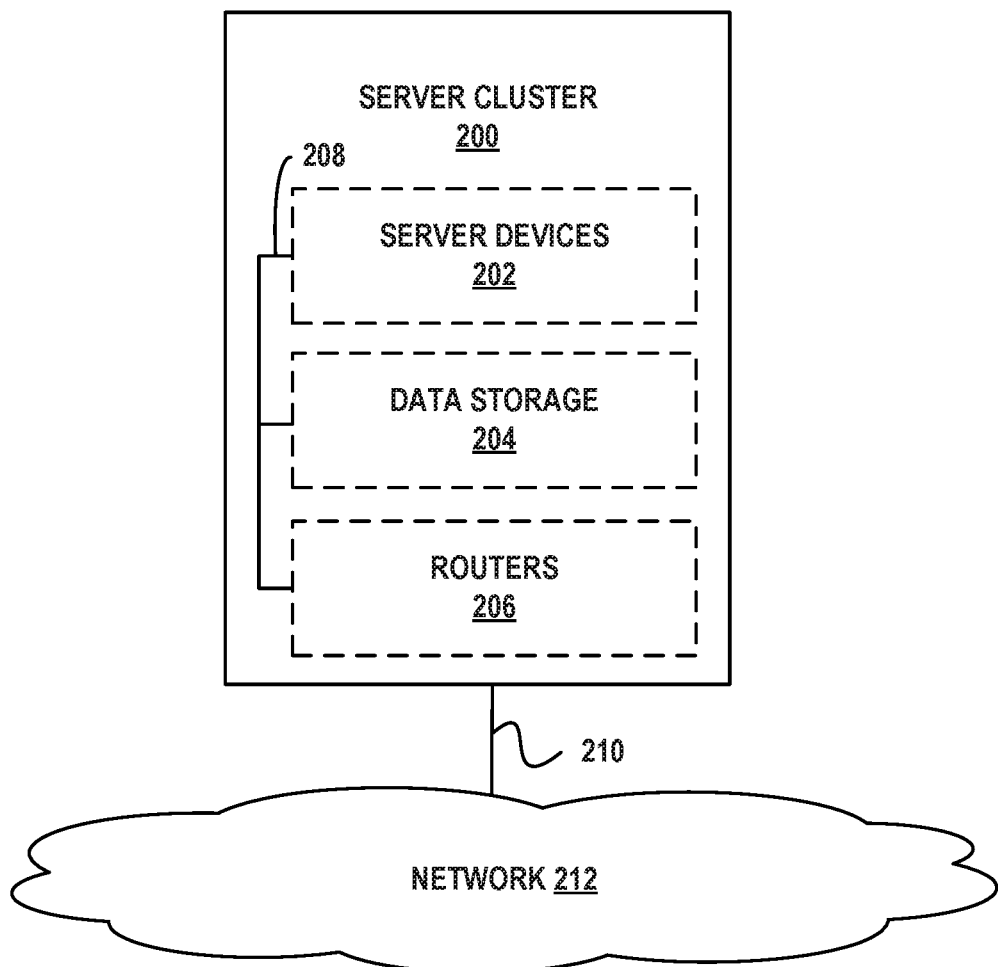
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
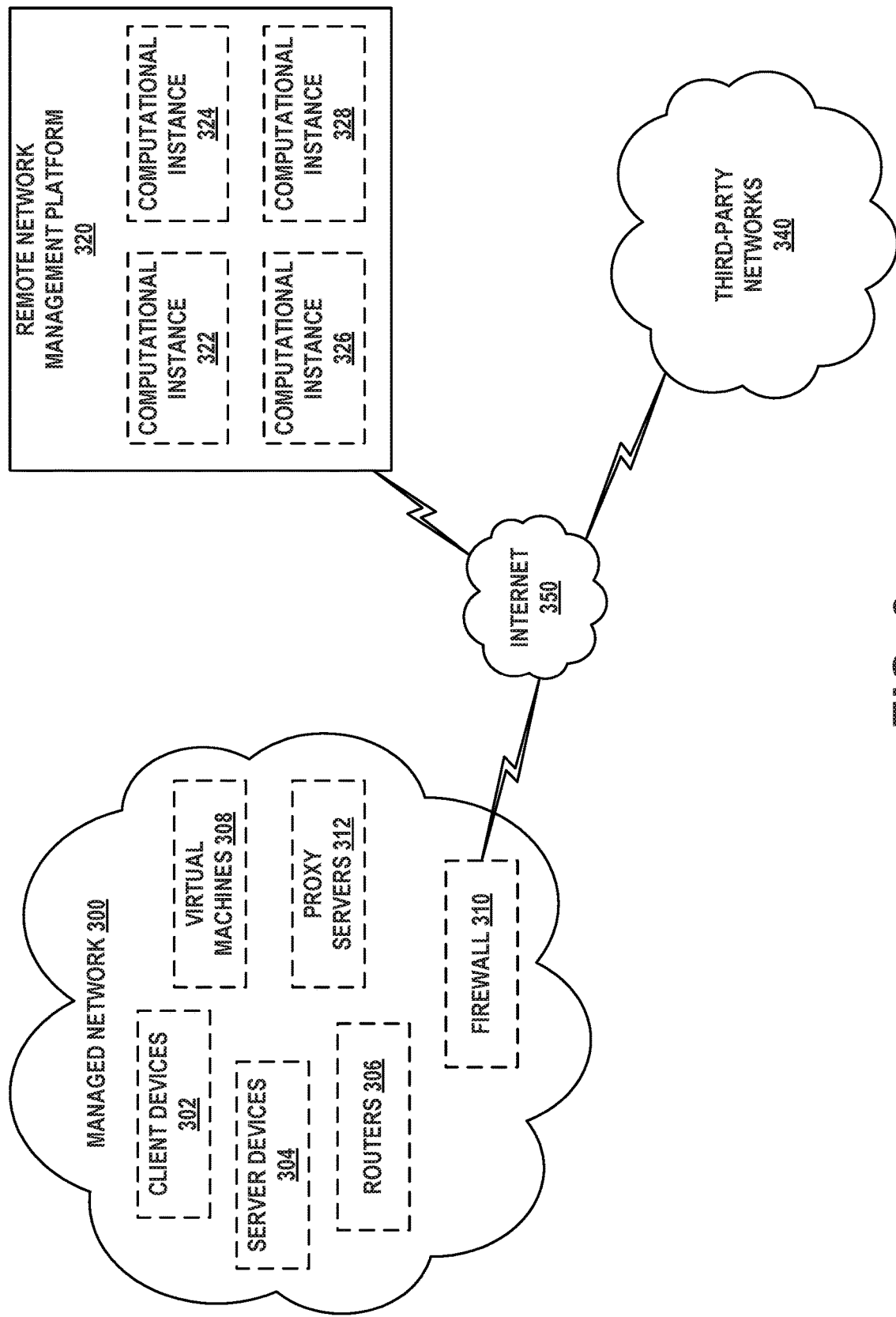
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability. In some cases, third-party networks 340 may include one or more public cloud services.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
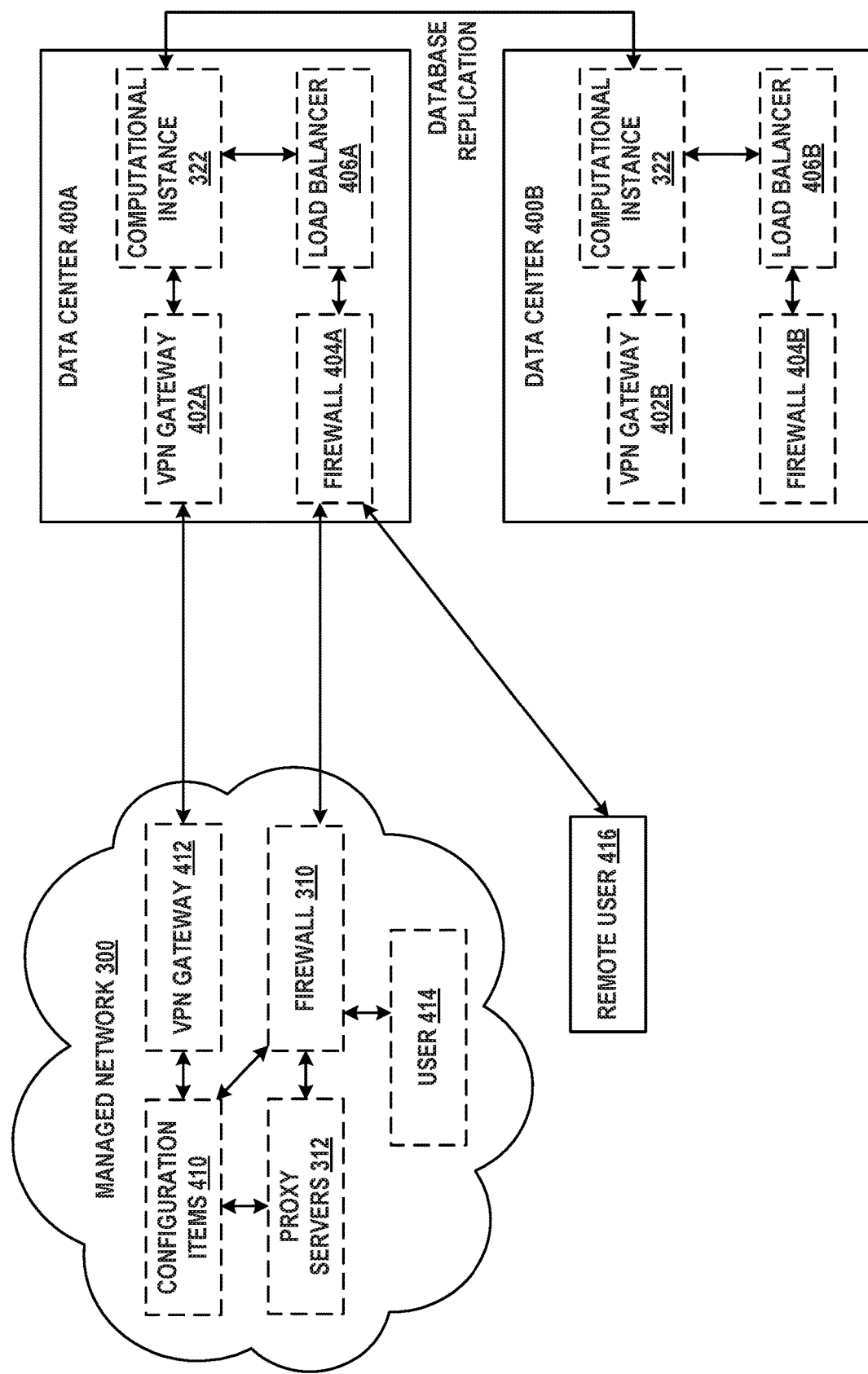
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
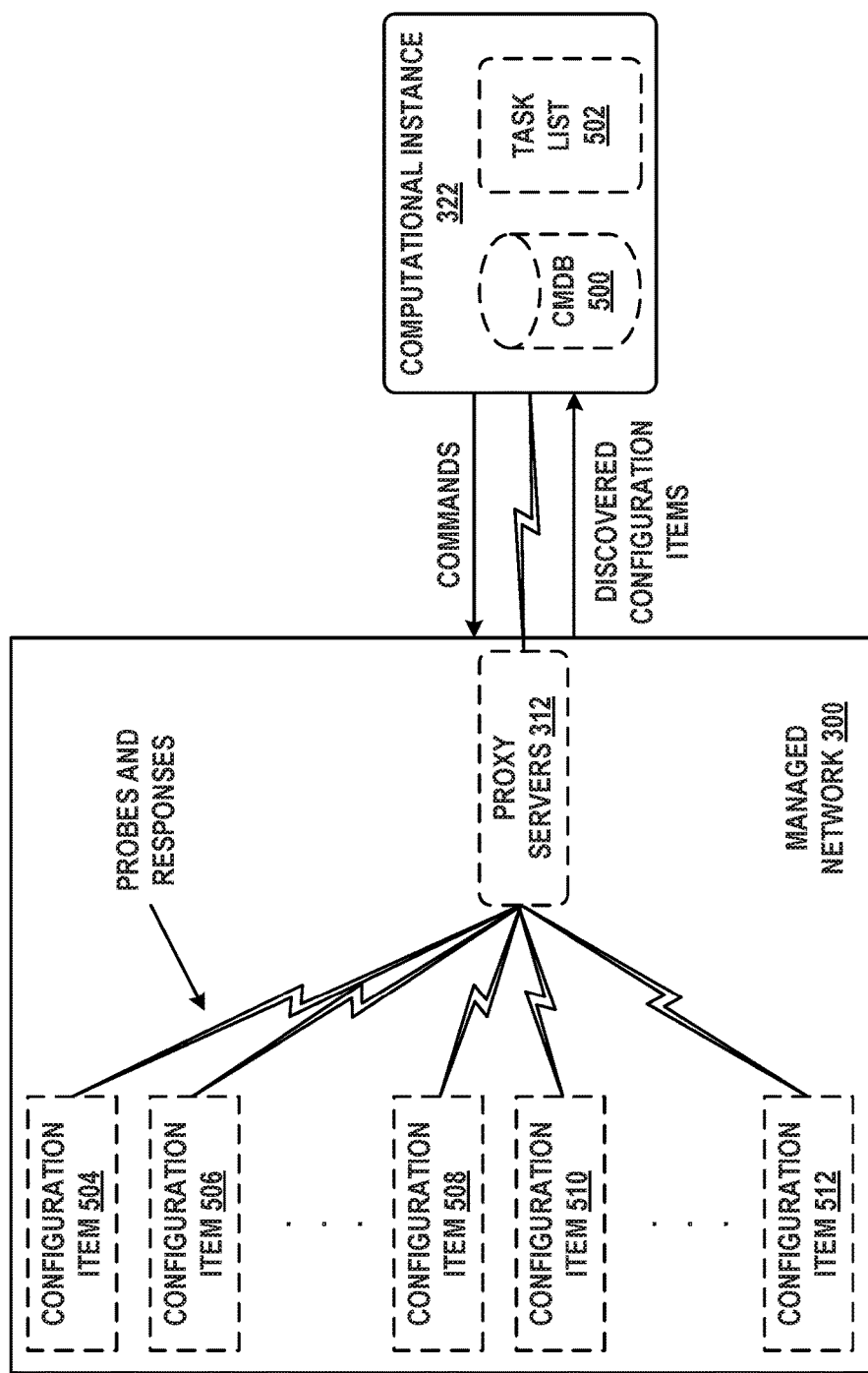
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
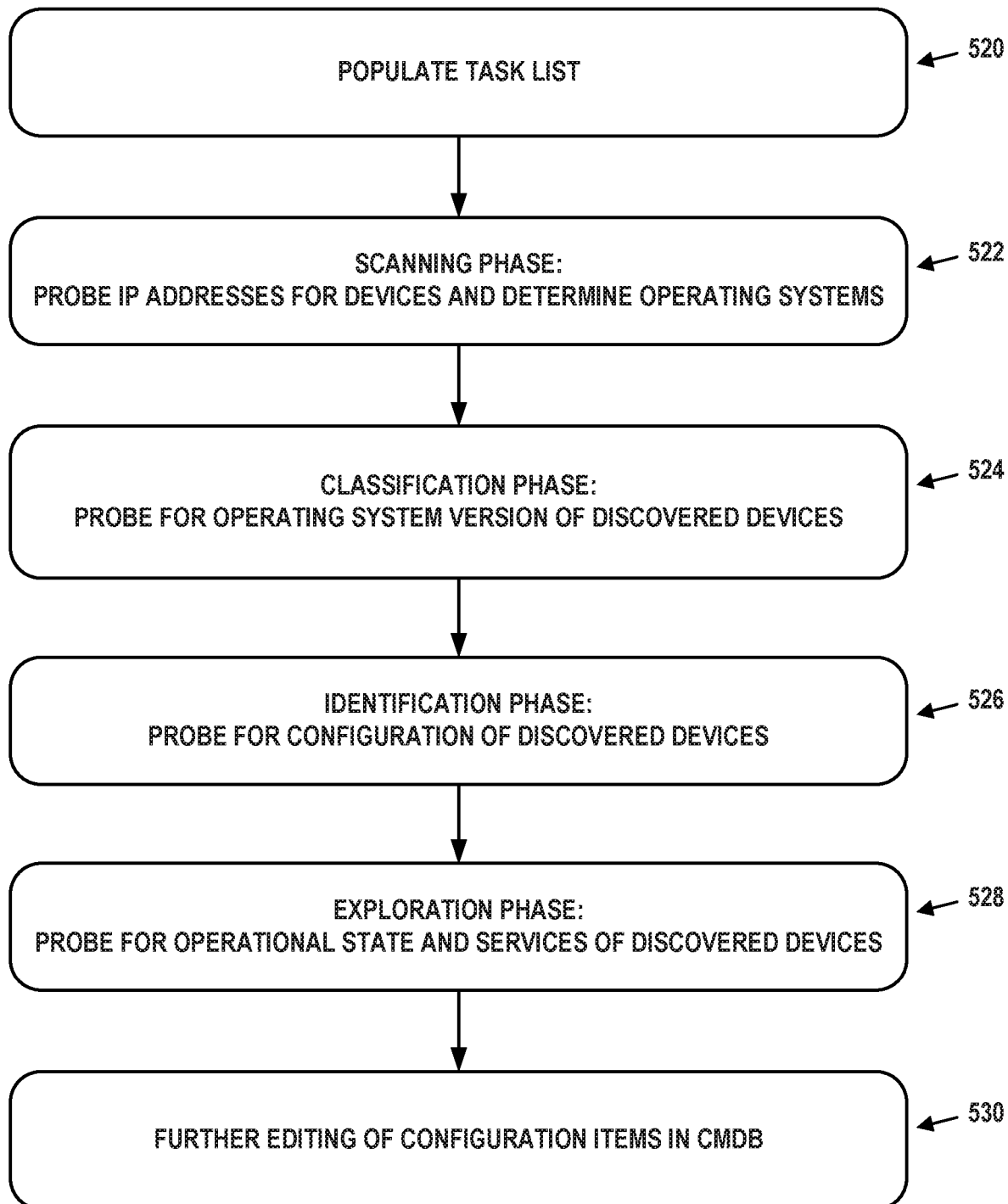
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. RESOURCE TAGS IN PUBLIC CLOUD ENVIRONMENTS

Public cloud systems, such as Amazon's AWS® and Microsoft's AZURE®, provide outsourced computational resources to many organizations (herein, the terms "resources" and "computational resources" may be used interchangeably when referring to computing environments provided by public cloud services). After establishing an account with one of these cloud providers, an organization can allocate resources for as-needed or on-demand use. These resources may include processors, virtual machines, storage, databases, load balancers, APIs, authentication services, and so on. Using public cloud services allows an organization to deploy a web-based (or non-web-based) service for internal or external use without having to obtain, configure, and maintain the requisite computer hardware components as well as some software components.

As an example, an organization that wishes to deploy a music streaming service may do so by obtaining storage and processing resources from a public cloud service, and configuring these resources to provide access to music files stored within the public cloud service. In another example, an organization can deploy a web site to a public cloud service by configuring, for example, a load balancer, one or more web servers, and one or more databases across public cloud resources. The public cloud provider may charge the organization for reserving resources for future use, or on-demand as these resources are used.

Management of public cloud resources can be a complex task especially for medium and large organizations in which multiple departments or divisions each utilize different blocks of these resources. In some cases, public cloud resources may be part of an overarching service or orchestrated workflow that involves coordination between the public cloud resources as well as other resources that are within the organization or within a computational instance of a remote network management platform. Further, some organizations may use resources across two or more public cloud providers. For example, a web service may be replicated in both AWS® and AZURE® for purposes of redundancy.

Each public cloud resource may be assigned a per-cloud unique resource identifier (ID) by its respective public cloud service. An example of this identifier may be a text string of the format "svc-1234567890abcdef0". Other formats are possible. As resource IDs may be assigned in a random, pseudo-random, incremental, or other fashion, they are generally not descriptive of the resource they identify. For example, it may not be clear to a user whether "svc-1234567890abcdef0" refers to a virtual machine, storage container, or some other type of resource. The intended use of this resource also may not be clear.

To address this limitation, tags may be associated with resources. Each tag may include a free-form, textual key-value pair that provides an opportunity to categorize or classify resources in some fashion. As an example, an organization may group its resources into two types of environments, production and testing. The production environment is used for live operation of services provided by the resources (e.g., web services) and the testing environment may be used internally by the organization for testing these services. Thus, it may be advantageous for the organization to be able to tag some or all resources as either being used for production or testing. This would allow a better understanding of the extent of resources allocated for each environment, as well as the cost of providing these environments.

According, the organization may introduce tags with the key "environment". The values of these tags may be, for example, "production" for resources used in the production environment, or "test" for resources used in the testing environment. Each tag may also be associated with its resource by way of the appropriate resource ID, hence taking on the form (key, value, resource ID). Thus, for instance, the following tags may exist in a public cloud system: ("environment", "production", "svc-1234567890abcdef0") and ("environment", "test", "svc-abcdef01234567890"). Configured in this fashion, a user can search for and identify all production or all testing resources.

Further, multiple tags can be associated with the same resource. In this way, resources can be categorized or classified in multiple dimensions. For example, if the tag ("service", "web", "svc-1234567890abcdef0") is added, then the resource "svc-1234567890abcdef0" can be associated with both the production environment and a web service operating thereon.

While tags are currently useful within the context of the public cloud service in which they are defined, they can be even more useful when discovered and stored in a CMDB. In this way, tags can be associated with configuration items in the CMDB that represent public cloud resources. As configuration items have a richer set of attributes and related information than the resources themselves, tags can be used in combination with these attributes to further categorize/classify resources, search for resources, and filter ensuing search results. Additionally, for public cloud resources associated with a service or workflow that spans more than just the public cloud infrastructure, tags can help identify which of these resources contribute to the service. Moreover, when the organization is using multiple public cloud providers, assigning consistent tags to resources across these providers can help identify the extent of resources associated with various services or activities.

Figure 6:
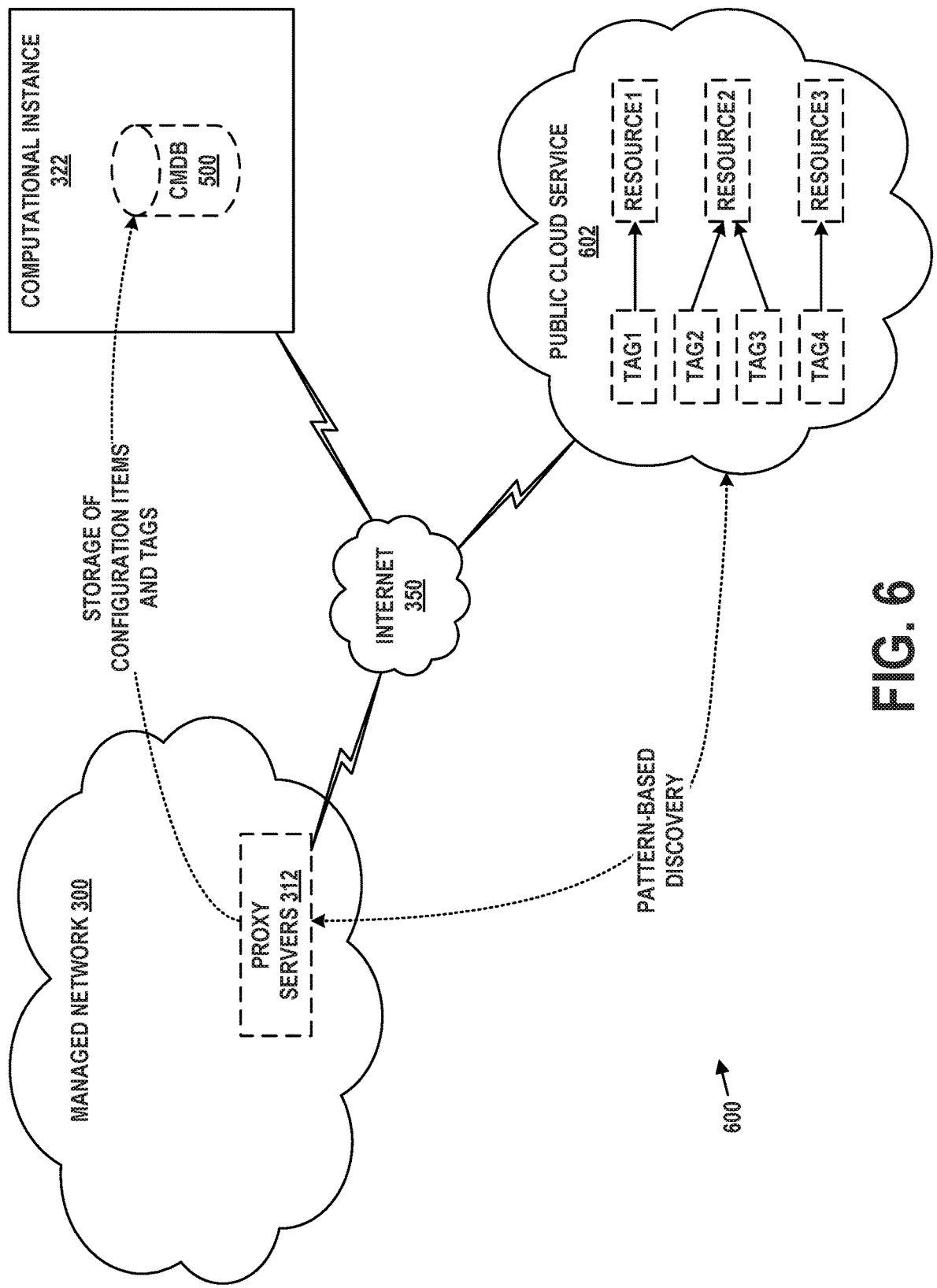
FIG. 6 depicts a network architecture supporting cloud-based discovery, in accordance with example embodiments.

FIG. 6 provides network architecture 600 for discovery of tags in a public cloud service 602. Network architecture 600 includes managed network 300, computational instance 322, and public cloud service 602, all connected by way of Internet 350.

Managed network 300 includes proxy server(s) 312 and may include other devices and software applications as described above, but these are omitted from FIG. 6 for purposes of simplicity. Network architecture 600 also contains computational instance 322, which includes CMDB 500. As described above, computational instance 322 may be part of remote network management platform 320 and may include various devices and software services used to remotely administer aspects of managed network 300.

Public cloud service 602 may include a number of computational resources, such as processors, virtual machines, units of storage, databases, load balancers, APIs, authentication services, and so on. These are represented in FIG. 6 as resource1, resource2, and resource3. But in many situations, hundreds, thousands, or more computational resources may be employed by an organization such as managed network 300. These computational resources may be allocated for use statically or on demand, and managed network 300 may pay for the resources that it is allocated and/or uses. Managed network 300 may have one or more sets of credentials (e.g., userids and passwords) with which it can securely access public cloud service 602. Through use of these credential to log on to or otherwise access public cloud service 602, managed network 300 can allocate resources, view allocated resources, change the configuration of allocated resources and/or deallocate resources.

As noted above, tags may be associated with these computational resources. In particular, a tag includes a key field, a value field, and a resource ID field. The resource ID field is intended to contain the resource ID of a computational resource. Thus, each tag can be configured to point to exactly one computational resource.

In FIG. 6, four tags are depicted, tag1, tag2, tag3, and tag4. The key and value fields of these tags are not shown for purposes of simplicity, but may be free-form text strings indicating a type of deployment, an owner, an administrator, a cost center, a department, or some other designation. The resource ID field of each of these tags is represented by an arrow that points to the associated resource. Thus, tag1 has a resource ID field that contains the resource ID of resource1, tag2 has a resource ID field that contains the resource ID of resource2, and so on.

Notably, two tags may refer to the same resource by including the resource ID of that resource. For instance, tag2 and tag3 in FIG. 6 both refer to resource2. Likewise, tags with the same key field and value field may refer to different resources, thus grouping those resources. For instance, if tag1 and tag4 have the same key field and value field, then resource1 and resource3 are logically grouped.

Public cloud service 602 may provide an API for creating, querying, updating and deleting tags. This API may be a representational state transfer (REST) API using HTTP, for instance, but other types of APIs may be used. As an example, to query the tags associated with an account on an AWS® cloud, the request URL may take the following form: "https://tagging.{region}.amazonaws.com", where {region} is a location of the AWS® cloud begin queried, such as "us-west-2". The HTTP method may be POST, and the header and body may roughly adhere to the following structure:

```
POST / HTTP/1.1
Host: tagging.us-west-2.amazonaws.com
Accept-Encoding: identity
Content-Length: 18
X-Amz-Target: ResourceGroupsTaggingAPI_20170126.GetTagValues
X-Amz-Date: 20190603T214524Z
Content-Type: application/x-amz-json-1.1
Authorization: AUTHPARAMS
{
    "Key": "my_key"
}
```

This particular query requests all tag values with a corresponding key of "my_key" from AWS® region "us-west-2" to be provided in JavaScript Object Notation (JSON) format. A corresponding response may be formatted as shown below:

```
HTTP/1.1 200 OK
x-amzn-RequestId: d3cf21f0-26db-11e7-a532-75e05382c8b1
Content-Type: application/x-amz-json-1.1
Content-Length: 42
Date: Mon, 3 Jun 2019 21:45:25 GMT
{
    "PaginationToken": "",
    "TagValues": [
        "my_value1",
        "my_value2"
    ]
}
```

This response has a JSON-formatted body containing all of the value fields (my_value1 and my_value2) associated with the key field my_key in the tags. Similar queries and responses may be used to obtain a list of key fields, a list of tagged resources, and so on.

In some cases, the API may support requesting tags by resource type with a "ResourceTypeFilters": ["type"] object placed in the body of the request, where the word "type" is replaced by an identifier of a resource type. These resource types may be specific to each public cloud provider. For example, AWS® may refer to its Elastic Compute Cloud (EC2) resources as "ec2". When such a resource type is provided in the query (e.g., "ResourceTypeFilters": ["ec2"]), public cloud service 602 may filter the information provided so that the associated response only includes results for EC2 resources. Similar resource type identifiers may be used for other AWS® services such as S3 (s3), Lambda (lambda), RDS (rds), Route 53 (route53), DynamoDB (dynamodb), and API Gateway (apigateway).

Other public cloud providers may use different query formats, response formats, and APIs. The AWS® examples above are for purposes of illustration and not limiting.

As shown by the dotted lines in FIG. 6, proxy server(s) 312 may execute pattern-based discovery on public cloud service 602. Generally speaking, a pattern is a series of operations that tell a software application carrying out discovery operations what credentials to use to access the public cloud, what computational resources therein to discover as configuration items, and what CMDB tables to populate with these configuration items. As part of executing pattern-based discovery, proxy server(s) 312 may discover (using the above APIs) tags along with configuration items, or just discover tags.

Once the configuration items and/or tags are discovered, they may be stored in CMDB 500. Thus, proxy server(s) may transmit the configuration items and/or tags to computational instance 322 for storage.

Figure 7:
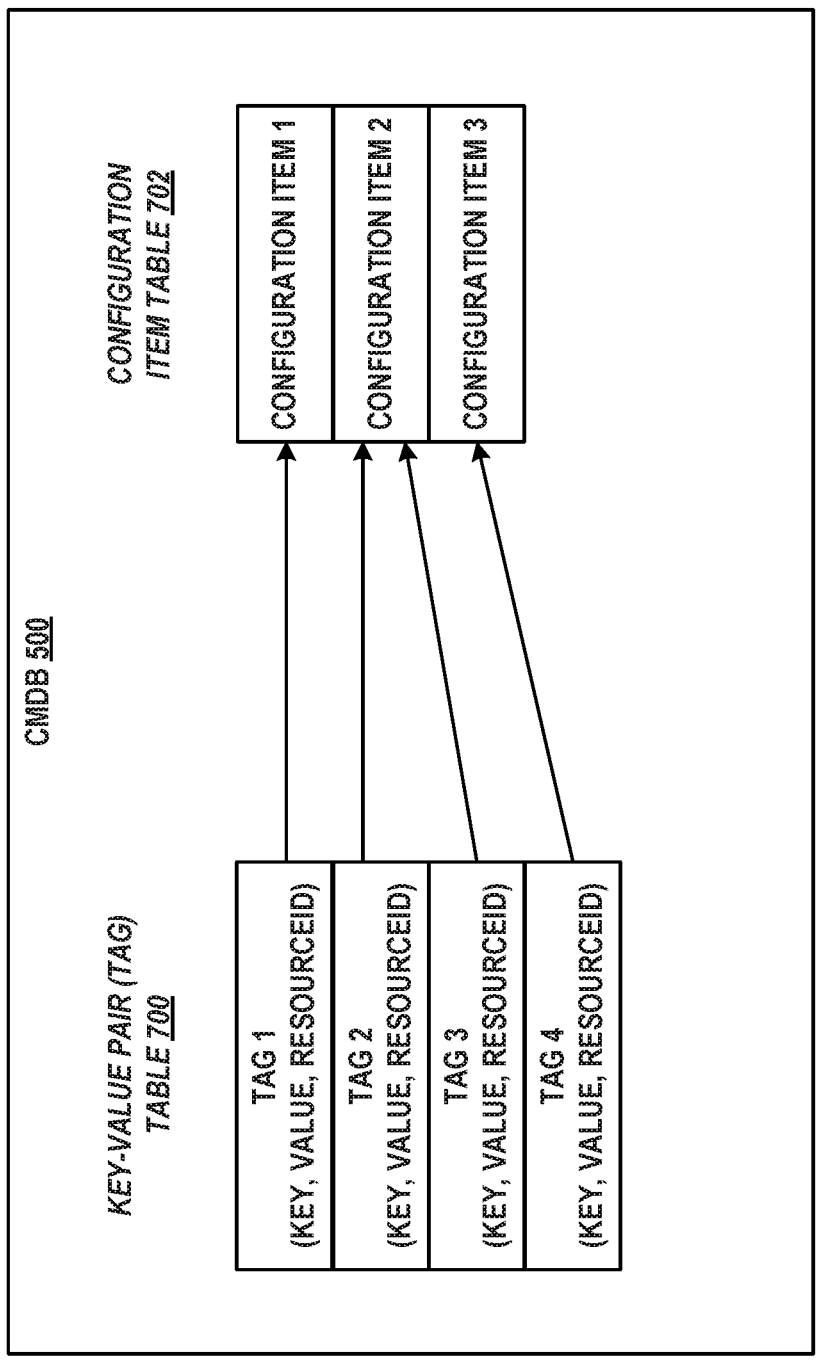
FIG. 7 depicts a partial database schema, in accordance with example embodiments.

FIG. 7 depicts a possible storage arrangement of these configuration items and tags in CMDB 500. In particular, CMDB 500 contains two tables, key-value-pair table 700 and configuration item table 702. Here, it is assumed that computational resources discovered on public cloud service 602 are stored as configuration items in configuration item table 702. It is further assumed that these configuration items contain the unique resource IDs of each of the computational resources as attributes. Key-value-pair table 700 contains the key field, value field, and resource ID of each discovered tag.

The arrows from key-value-pair table 700 to configuration item table 702 represent the relationships between tags and configuration items. Thus, for example, tag 1 has a resource ID that matches that of configuration item 1, so tag 2 is related to configuration item 1. Similarly, tag 2 has a resource ID that matches that of configuration item 2, so tag 2 is related to configuration item 2.

In this manner, a search through the tags in key-value-pair table 700 can identify the associated configuration items. Since tags may originate from various sources other than public cloud service 602 and may be associated with configuration items that represent hardware or software not in public cloud service 602, this search may identify all configuration items associated with a particular service, owner, cost center, environment, etc. represented by the tags that were subject of the search.

Regardless, there are at least two different ways that proxy server(s) 312 can interact with public cloud service 602 and computational instance 322 to obtain and store tags. These are illustrated in FIGS. 8 and 9.

Figure 8:
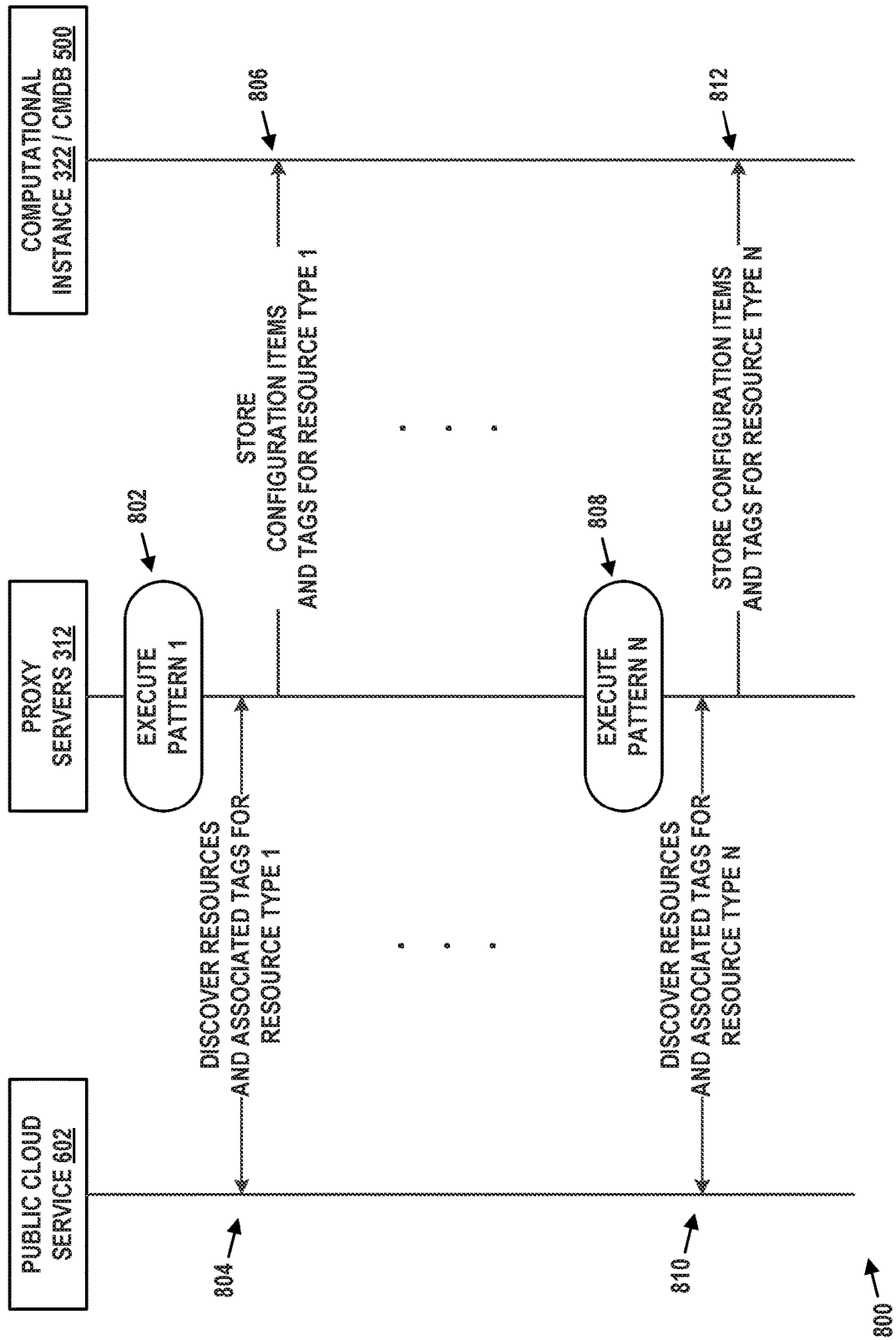
FIG. 8 depicts a message flow, in accordance with example embodiments.
Figure 9:
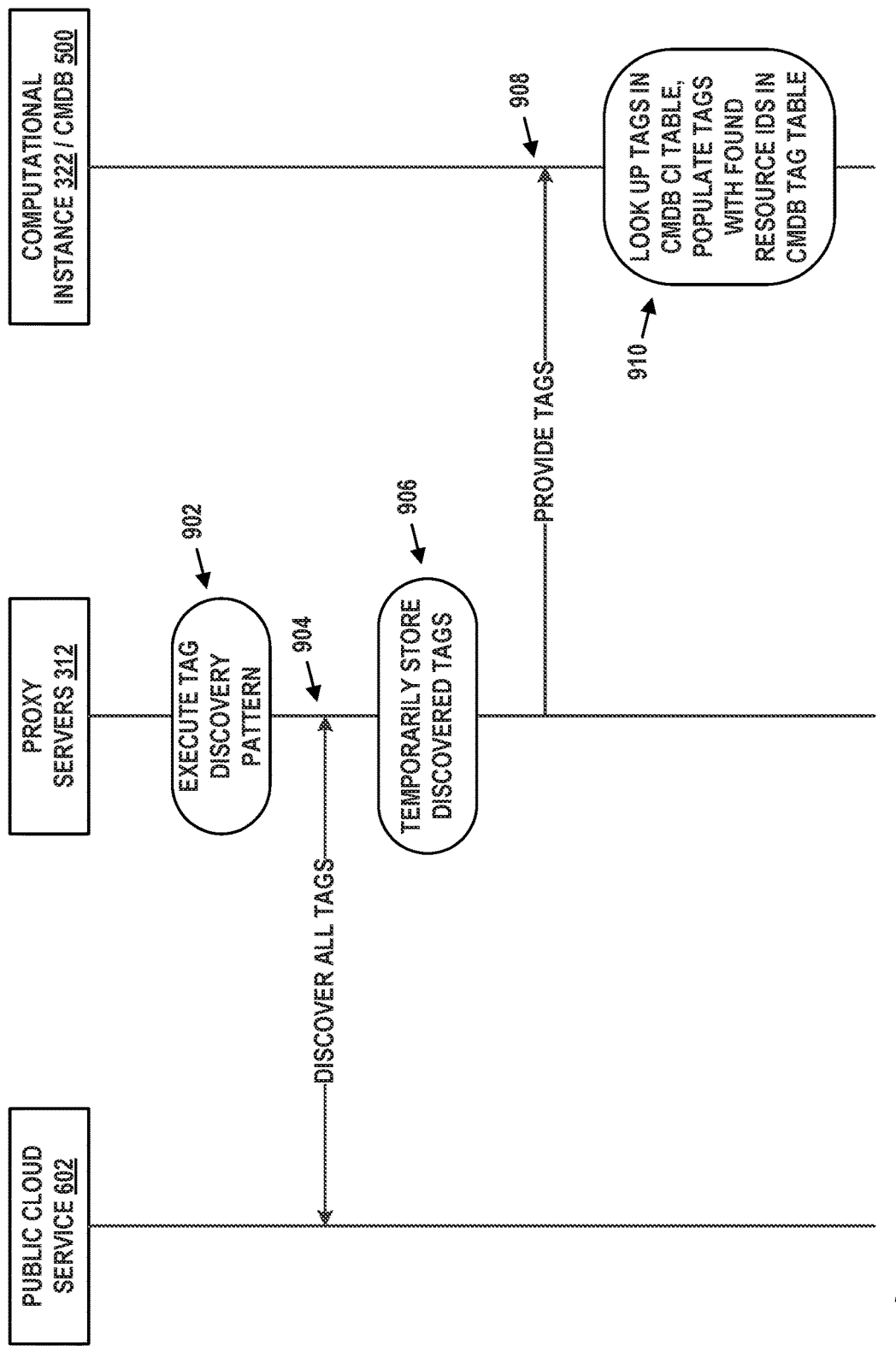
FIG. 9 depicts another message flow, in accordance with example embodiments.

In FIG. 8, message flow 800 involves proxy server(s) 312 executing one or more patterns, each focused on a particular resource type (e.g., AWS® services such as S3, Lambda, RDS, Route 53, DynamoDB, and API Gateway). Such a pattern may be configured to discover computational resources of that resource type, and may be modified to include a section that also discovers tags associated with those computational resources.

Accordingly, at step 802, proxy server(s) 312 executes pattern 1. As indicated by step 804, this pattern may be configured to discover computational resources and associated tags. As an example, a pattern may query one or more REST APIs of public cloud service 602, specifying the resources, resource type, key fields of the tags, and/or other parameters. In response, public cloud service 602 may provide representations of the computational resources and associated tags specified by the query.

With these representations on hand, proxy server(s) 312 may organize them into a format that can be inserted into key-value-pair table 700 and configuration item table 702 (not shown). At step 806, proxy server(s) 312 transmits a request to store the configuration items and associated tags in CMDB 500 of computational instance 322.

This process may repeat for any number of different resource types. For example, at step 808, proxy server(s) 312 executes pattern n. As indicated by step 810, this pattern may be configured to discover computational resources and associated tags of a different resource type than pattern 1. Like step 804, public cloud service 602 may provide representations of the computational resources and associated tags specified by the query.

Proxy server(s) 312 may organize these representations into a format that can be inserted into key-value-pair table 700 and configuration item table 702 (not shown). Thus, at step 812, proxy server(s) 312 transmits a request to store the configuration items and associated tags in CMDB 500 of computational instance 322.

The advantage of this approach is that it is relatively simple to add, to a pattern already configured to discover computational resources of a given resource type, logic to discover associated tags. Further, since the computational resources and tags are discovered together (or at least sequentially) it is relatively straightforward to correlate computational resources and tags to one another for storage in CMDB 500. On the other hand, this approach involves making a modification to each pattern that discovers a resource type, and there may be many such patterns.

FIG. 9 depicts a different approach in message flow 900. At step 902, proxy server(s) 312 execute a tag discovery pattern. This pattern may be configured to only discover tags, and may discover all tags configured in public cloud service 602 available to the user. Accordingly, at step 904, all tags are discovered. Similar to the embodiment described above, the pattern may query one or more REST APIs of public cloud service 602, specifying the resources, key fields of the tags, and/or other parameters. In response, public cloud service 602 may provide representations of the associated tags specified by the query.

At step 906, proxy server(s) 312 may temporarily store the discovered tags. This is an optional step that may be beneficial when a large number of tags are discovered and they cannot all be provided to computational instance 322 at once.

At step 908, proxy server(s) 312 provides representations of the tags to computational instance 322. In some cases, this step may involve several distinct transmissions of tags. Regardless, at step 910, computational instance 322 may look up, in configuration item table 702 of CMDB 500, the resource ID of each tag it receives. If the resource ID is found in the configuration item table, the tag is added to tag table 700 in CMDB 500.

In this manner, tags for computational resources represented by configuration items in CMDB 500 can be added to CMDB 500. Other tags may also be added to CMDB 500 or not added to CMDB 500 as preference dictates.

The advantage to this approach is that it obtains all relevant tags in a single pattern and does not require editing a number of existing patterns. On the other hand, an additional step of looking up and correlating the tags to existing configuration items in CMDB 500 is used.

It should be clear form the discussion above that both the approaches of FIG. 8 and FIG. 9 have different advantages. Each may be more useful in some deployments than in others. Thus, organizations may prefer one approach or the other based on their specific needs. In some embodiments, a combination of both approaches could be used. Regardless, either approach—deployed alone or in combination with other mechanisms—is an improvement over not incorporating tags in CMDB 500.

VI. EXAMPLE OPERATIONS

Figure 10:
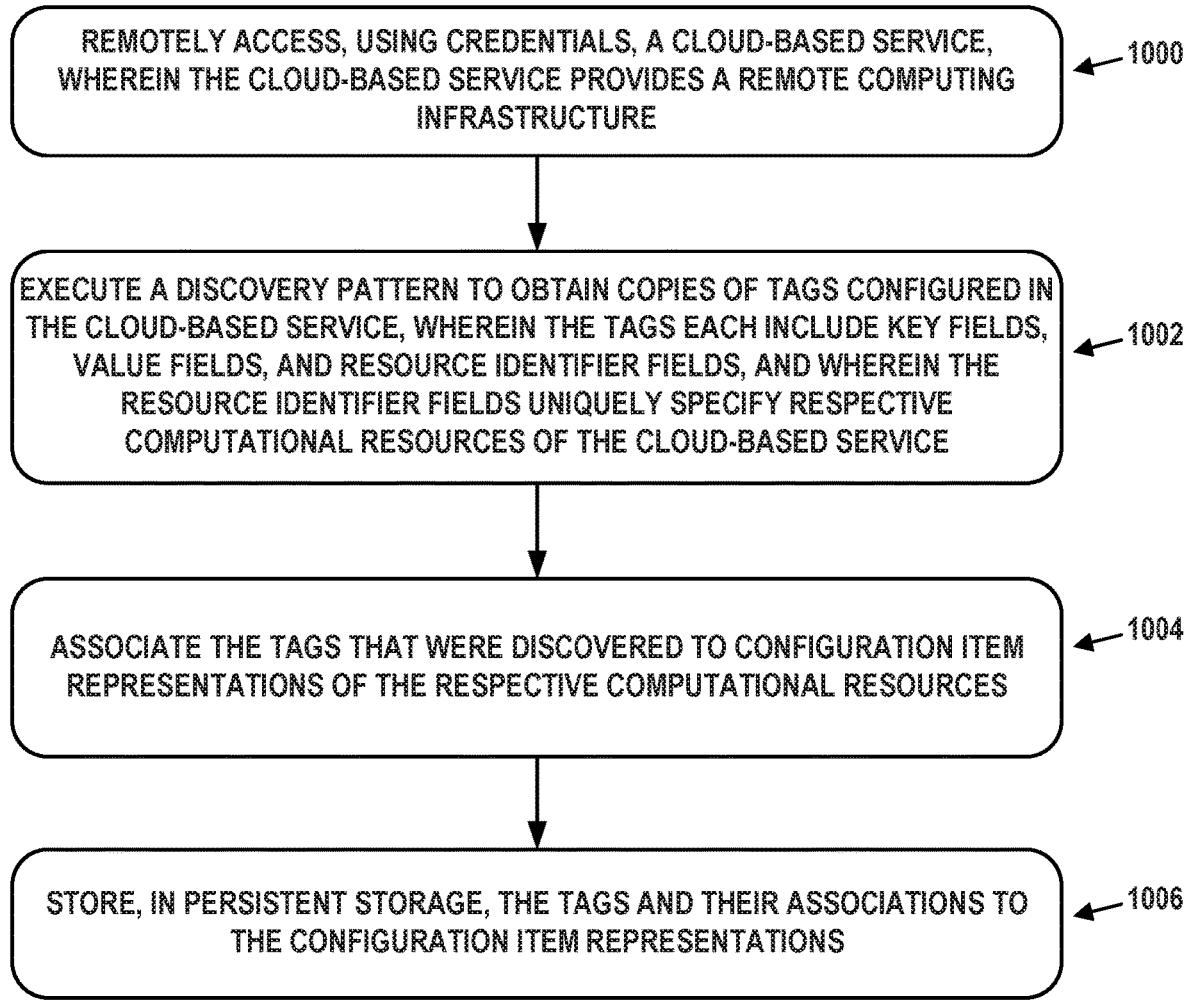
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve remotely accessing, by one or more processors and using credentials, a cloud-based service, where the cloud-based service provides a remote computing infrastructure. The cloud-based service may be connected, by way of a public network (e.g., the Internet) to a computational instance of a remote network management platform and a managed network administrated by way of the computational instance.

Block 1002 may involve executing, by the one or more processors, a discovery pattern to obtain copies of tags configured in the cloud-based service, where the tags each include key fields, value fields, and resource identifier fields, and where the resource identifier fields uniquely specify respective computational resources of the cloud-based service.

Block 1004 may involve associating, by the one or more processors, the tags that were discovered to configuration item representations of the respective computational resources.

Block 1006 may involve storing, by the one or more processors and in persistent storage of the computational instance, the tags and their associations to the configuration item representations.

In some embodiments, the respective computational resources include a processor, a virtual machine, a unit of storage, a database, a load balancer, an application programming interface, or an authentication service.

In some embodiments, the one or more processors are disposed within a proxy server device, where the proxy server device is disposed within a managed network, and where storing the tags and their associations to the configuration item representations comprises transmitting the tags and their associations to the computational instance. In some cases, the computational instance is configured to store the tags and their associations to the configuration item representations in the persistent storage.

In some embodiments, the one or more processors are disposed within a proxy server device, wherein the proxy server device is disposed within a managed network, and where executing the discovery pattern to obtain the copies of the tags configured in the cloud-based service comprises executing the discovery pattern to obtain the copies of the tags associated with a particular type of computational resource. In some cases, the persistent storage also includes a second discovery pattern, where the one or more processors are further configured to: execute the second discovery pattern to obtain copies of further tags associated with a second particular type of computational resource configured in the cloud-based service; associate the further tags that were discovered to configuration item representations of the respective computational resources; and transmit the further tags and their associations to the computational instance.

In some embodiments, a first group of the one or more processors is disposed within a proxy server device and a second group of the one or more processors is disposed in the computational instance, where the proxy server device is disposed within a managed network, where remotely accessing the cloud-based service and executing the discovery pattern is performed by the proxy server device, and wherein associating the tags that were discovered to configuration item representations of the respective computational resources and storing the tags and their associations to the configuration item representations is performed by the computational instance. In some cases, the proxy server device also transmits the tags to the computational instance. Further, associating the tags that were discovered to configuration item representations of the respective computational resources may involve: searching the persistent storage to identify stored configuration items specifying resource identifiers that match the resource identifier fields of the tags; and storing, in the persistent storage, copies of the tags with matching resource identifier fields. The persistent storage may include a database, where the stored configuration items are represented in a configuration item table of the database, and where the copies of the tags with matching resource identifier fields are represented in a key-value-pair table of the database.

In some embodiments, the persistent storage also maintains a second discovery pattern and second credentials for a second cloud-based service, where the second cloud-based service provides a second remote computing infrastructure, and where the one or more processors are further configured to: remotely access, using the second credentials, the second cloud-based service; execute the second discovery pattern to obtain copies of further tags configured in the second cloud-based service; associate the further tags that were discovered to second configuration item representations of respective computational resources disposed within the second cloud-based service; and store, in the persistent storage, the further tags and their associations to the second configuration item representations.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
a computational instance including persistent storage that maintains a discovery pattern and credentials for a cloud-based service, wherein the cloud-based service provides a remote computing infrastructure; and
one or more processors configured to:
remotely access, using the credentials, the cloud-based service;
execute the discovery pattern to obtain copies of one or more tags configured in the cloud-based service, wherein the one or more tags each include a key field, a value field, and a resource identifier field, and wherein each resource identifier field uniquely specifies a respective computational resource of one or more computational resources of the cloud-based service;
associate the one or more tags that were discovered to one or more configuration item representations of the one or more computational resources stored in a configuration management database (CMDB) by:
matching the resource identifier field of each respective tag to an additional resource identifier field of a respective configuration item representation of the one or more configuration item representations; and
generating an association between the respective tag and the respective configuration item representation based on the resource identifier field matching the additional resource identifier field; and store, in the CMDB, the one or more tags and their respective associations to the one or more configuration item representations.

2. The system of claim 1, wherein the one or more computational resources include a processor, a virtual machine, a unit of storage, a database, a load balancer, an application programming interface, or an authentication service.

3. The system of claim 1, wherein the one or more processors are disposed within a proxy server device, wherein the proxy server device is disposed within a managed network, and wherein storing the one or more tags and their respective associations to the one or more configuration item representations comprises transmitting the one or more tags and their respective associations to the computational instance.

4. The system of claim 1, wherein the one or more processors are disposed within a proxy server device, wherein the proxy server device is disposed within a managed network, and wherein executing the discovery pattern to obtain the copies of the one or more tags configured in the cloud-based service comprises executing the discovery pattern to obtain the copies of the one or more tags associated with a particular type of computational resource.

5. The system of claim 4, wherein the persistent storage includes a second discovery pattern, and wherein the one or more processors are configured to:
execute the second discovery pattern to obtain copies of one or more further tags associated with a second particular type of computational resource configured in the cloud-based service;
associate the one or more further tags that were discovered to the one or more configuration item representations of the respective computational resources; and
transmit the one or more further tags and their respective associations to the computational instance.

6. The system of claim 1, wherein a first group of the one or more processors is disposed within a proxy server device and a second group of the one or more processors is disposed in the computational instance, wherein the proxy server device is disposed within a managed network, wherein remotely accessing the cloud-based service and executing the discovery pattern is performed by the proxy server device, and wherein associating the one or more tags that were discovered to the one or more configuration item representations of the respective computational resources and storing the one or more tags and their respective associations to the one or more configuration item representations is performed by the computational instance.

7. The system of claim 6, wherein the proxy server device transmits the one or more tags to the computational instance.

8. The system of claim 1, wherein the persistent storage comprises the CMDB, wherein the configuration item representations are represented in a configuration item table of the CMDB, and wherein the copies of the tags are represented in a key-value-pair table of the CMDB.

9. The system of claim 1, wherein the persistent storage maintains a second discovery pattern and second credentials for a second cloud-based service, wherein the second cloud-based service provides a second remote computing infrastructure, and wherein the one or more processors are configured to:
remotely access, using the second credentials, the second cloud-based service;
execute the second discovery pattern to obtain copies of one or more further tags configured in the second cloud-based service;
associate the one or more further tags that were discovered to one or more second configuration item representations of respective computational resources disposed within the second cloud-based service; and
store, in the persistent storage, the one or more further tags and their respective associations to the one or more second configuration item representations.

10. The system of claim 1, wherein the one or more tags comprise one or more existing tags configured outside the computational instance before the cloud-based service is remotely accessed.

11. A computer-implemented method comprising:
remotely accessing, by one or more processors and using credentials, a cloud-based service, wherein the cloud-based service provides a remote computing infrastructure;
executing, by the one or more processors, a discovery pattern to obtain copies of one or more tags configured in the cloud-based service, wherein the one or more tags each include a key field, a value field, and a resource identifier field, and wherein each resource identifier field uniquely specifies a respective computational resource of one or more computational resources of the cloud-based service;
associating, by the one or more processors, the one or more tags that were discovered to one or more configuration item representations of the one or more computational resources stored in a configuration management database (CMDB) by:
matching the resource identifier field of each respective tag to an additional resource identifier field of a respective configuration item representation of the one or more configuration item representations; and
generating an association between the respective tag and the respective configuration item representation based on the resource identifier field matching the additional resource identifier field; and
storing, by the one or more processors and in the CMDB, the one or more tags and their respective associations to the one or more configuration item representations.

12. The computer-implemented method of claim 11, wherein the one or more processors are disposed within a proxy server device, wherein the proxy server device is disposed within a managed network, and wherein storing the one or more tags and their respective associations to the one or more configuration item representations comprises transmitting the one or more tags and their respective associations to the computational instance.

13. The computer-implemented method of claim 11, wherein the one or more processors are disposed within a proxy server device, wherein the proxy server device is disposed within a managed network, and wherein executing the discovery pattern to obtain the copies of the one or more tags configured in the cloud-based service comprises executing the discovery pattern to obtain the copies of the one or more tags associated with a particular type of computational resource.

14. The computer-implemented method of claim 13, wherein the persistent storage includes a second discovery pattern, the computer-implemented method comprising:
executing the second discovery pattern to obtain copies of one or more further tags associated with a second particular type of computational resource configured in the cloud-based service;
associating the one or more further tags that were discovered to the one or more configuration item representations of the respective computational resources; and transmitting the one or more further tags and their respective associations to the computational instance.

15. The computer-implemented method of claim 11, wherein a first group of the one or more processors is disposed within a proxy server device and a second group of the one or more processors is disposed in the computational instance, wherein the proxy server device is disposed within a managed network, wherein remotely accessing the cloud-based service and executing the discovery pattern is performed by the proxy server device, and wherein associating the one or more tags that were discovered to the one or more configuration item representations of the respective computational resources and storing the one or more tags and their respective associations to the one or more configuration item representations is performed by the computational instance.

16. The computer-implemented method of claim 11, wherein the persistent storage comprises the CMDB, wherein the configuration item representations are represented in a configuration item table of the CMDB, and wherein the copies of the tags are represented in a key-value-pair table of the CMDB.

17. The computer-implemented method of claim 11, wherein the persistent storage maintains a second discovery pattern and second credentials for a second cloud-based service, wherein the second cloud-based service provides a second remote computing infrastructure, the computer-implemented method comprising:
   remotely accessing, using the second credentials, the second cloud-based service;
   executing the second discovery pattern to obtain copies of one or more further tags configured in the second cloud-based service;
   associating the one or more further tags that were discovered to one or more second configuration item representations of respective computational resources disposed within the second cloud-based service; and
   storing, in the persistent storage, the one or more further tags and their respective associations to the second configuration item representations.

18. An article of manufacture including a non-transitory computer-readable medium, having stored thereon program instructions that, upon execution by a computing system, cause the computing system to perform operations comprising:
   remotely accessing, using credentials, a cloud-based service, wherein the cloud-based service provides a remote computing infrastructure;
   executing a discovery pattern to obtain copies of one or more tags configured in the cloud-based service, wherein the one or more tags each include a key field, a value field, and a resource identifier field, and wherein each resource identifier field uniquely specifies a respective computational resource of one or more computational resources of the cloud-based service;
   associating the one or more tags that were discovered to one or more configuration item representations of the one or more computational resources stored in a configuration management database (CMDB) by:
      matching the resource identifier field of each respective tag to an additional resource identifier field of a respective configuration item representation of the one or more configuration item representations; and
      generating an association between the respective tag and the respective configuration item representation based on the resource identifier field matching the additional resource identifier field; and
   storing, in the CMDB, the one or more tags and their respective associations to the one or more configuration item representations.

* * * * *